(12) United States Patent
Grossmann et al.

(10) Patent No.: US 10,259,542 B2
(45) Date of Patent: Apr. 16, 2019

(54) SUPPORT STRUCTURE FLOATING IN THE OPEN SEA AND CONNECTED TO ANCHORS BY BRACING MEANS, FOR WIND TURBINES, SERVICE STATIONS OR CONVERTER STATIONS

(71) Applicant: Gicon Windpower IP GmbH, Dresden (DE)

(72) Inventors: Jochen Grossmann, Dresden (DE); Frank Dahlhaus, Linkenheim-Hochstetten (DE)

(73) Assignee: Gicon Windpower IP GmbH, Dresden (DE)

( * ) Notice: Subject to any disclaimer, the term of this patent is extended or adjusted under 35 U.S.C. 154(b) by 443 days.

(21) Appl. No.: 15/033,653

(22) PCT Filed: Oct. 30, 2014

(86) PCT No.: PCT/EP2014/073342
§ 371 (c)(1),
(2) Date: May 2, 2016

(87) PCT Pub. No.: WO2015/063215
PCT Pub. Date: May 7, 2015

(65) Prior Publication Data
US 2016/0272284 A1 Sep. 22, 2016

(30) Foreign Application Priority Data
Oct. 30, 2013 (DE) .................. 10 2013 222 081

(51) Int. Cl.
*B63B 35/44* (2006.01)
*F03D 13/20* (2016.01)
(Continued)

(52) U.S. Cl.
CPC .............. *B63B 35/44* (2013.01); *B63B 1/107* (2013.01); *B63B 21/502* (2013.01); *E02B 17/00* (2013.01);
(Continued)

(58) Field of Classification Search
CPC .............. B63B 35/44; B63B 2035/446; B63B 2035/443; B63B 2035/444;
(Continued)

(56) References Cited

U.S. PATENT DOCUMENTS 4,875,806 A * 10/1989 Lindberg .............. B63B 21/502
405/224
5,704,731 A * 1/1998 Huang ..................... B63B 3/04
114/264
(Continued)

FOREIGN PATENT DOCUMENTS

| CN | 102758446 A | 10/2012 |
|---|---|---|
| DE | 102008003647 A1 | 7/2009 |

(Continued)

*Primary Examiner* — Frederick L Lagman
(74) *Attorney, Agent, or Firm* — Michael Soderman

(57) ABSTRACT

A support structure floating in the open sea and connected to anchors by bracing elements. The support structure has a first component arranged under water and a second component cutting through the surface of the water. Furthermore, the first component has first buoyant bodies arranged at corner points of a polygon and serving as carriers of the second component and second buoyant bodies connecting them with one another and having a tube shape. A nodal structure connecting at least two second buoyant bodies with one another and at least one U-shaped junction plate are arranged in the first buoyant body. The nodal structure is simultaneously the carrier for a tube-shaped support element and is therefore a node of the underwater support structure that absorbs and channels off forces in connection with the (Continued)

junction plate. The second component has the tube-shaped support elements cutting through the surface of the water.

9 Claims, 2 Drawing Sheets

(51) Int. Cl.
    *F03D 13/25*         (2016.01)
    *E02B 17/00*         (2006.01)
    *B63B 21/50*         (2006.01)
    *B63B 1/10*          (2006.01)

(52) U.S. Cl.
    CPC ............. *F03D 13/22* (2016.05); *F03D 13/25* (2016.05); *B63B 2035/446* (2013.01); *E02B 2017/0091* (2013.01); *F05B 2240/93* (2013.01); *F05B 2240/95* (2013.01); *Y02E 10/727* (2013.01)

(58) Field of Classification Search
    CPC .... B63B 2035/4446; B63B 2035/4453; B63B 9/065; E02B 2017/0091
    USPC ................ 405/223.1, 224; 114/264–266
    See application file for complete search history.

(56) References Cited

U.S. PATENT DOCUMENTS

| | | | |
|---|---|---|---|
| 7,156,586 B2 * | 1/2007 | Nim | B63B 35/44 405/195.1 |
| 8,893,638 B2 * | 11/2014 | Thieffry | B63B 9/065 114/264 |
| 9,523,355 B2 * | 12/2016 | Taub | B63B 21/50 |
| 2001/0002757 A1 * | 6/2001 | Honda | F03D 1/02 290/55 |
| 2006/0165493 A1 * | 7/2006 | Nim | B63B 35/44 405/223.1 |
| 2010/0219645 A1 | 9/2010 | Yamamoto et al. | |
| 2011/0037264 A1 * | 2/2011 | Roddier | B63B 35/44 290/44 |
| 2011/0107953 A1 * | 5/2011 | Jahnig | B63B 35/44 114/264 |
| 2011/0155038 A1 * | 6/2011 | Jahnig | B63B 1/107 114/264 |
| 2012/0103244 A1 * | 5/2012 | Gong | B63B 21/50 114/265 |
| 2012/0294681 A1 * | 11/2012 | Wong | F03D 9/257 405/224 |
| 2013/0019792 A1 * | 1/2013 | Jahnig | B63B 1/04 114/267 |
| 2013/0183163 A1 * | 7/2013 | Fyfe | E02D 27/42 416/244 R |
| 2013/0233231 A1 * | 9/2013 | Dagher | B63B 21/50 114/265 |
| 2015/0329180 A1 * | 11/2015 | Tominaga | B63B 35/44 114/265 |
| 2016/0075413 A1 * | 3/2016 | Nebrera Garcia | E02D 27/42 114/122 |
| 2016/0369780 A1 * | 12/2016 | Aubault | F03D 13/25 |
| 2018/0134344 A1 * | 5/2018 | Dagher | F03D 13/25 |

FOREIGN PATENT DOCUMENTS

| | | | | |
|---|---|---|---|---|
| DE | 102009054608 A1 | | 6/2011 | |
| FR | 2967642 | * | 5/2012 | ............ H02S 10/20 |
| FR | 3021027 | * | 11/2015 | |
| FR | 3052817 A1 | * | 12/2017 | ............ F03D 13/25 |
| WO | 2013040871 A1 | | 3/2013 | |
| WO | WO-2014202846 A1 | * | 12/2014 | ............ H02S 10/20 |

* cited by examiner

SUPPORT STRUCTURE FLOATING IN THE OPEN SEA AND CONNECTED TO ANCHORS BY BRACING MEANS, FOR WIND TURBINES, SERVICE STATIONS OR CONVERTER STATIONS

CROSS REFERENCE TO RELATED APPLICATIONS

This application is the U.S. national stage of International Application No. PCT/EP2014/073342, filed on Oct. 30, 2014, and claims the priority thereof. The international application claims the priority of German Application No. DE 102013222081.2 filed on Oct. 30, 2013; all applications are incorporated by reference herein in their entirety.

BACKGROUND

The invention relates to support structures floating in the open sea and connected to anchors by bracing means, for wind turbines, service stations or converter stations.

Floating buoyant bodies in connection with anchors for wind turbines in the open sea are known via the document GB 2 378 679 A, as an example. The floating foundation realized for that is comprised of several buoyant bodies that are connected via radial steel struts to the tower of the wind turbine. The steel struts are arranged in a cross shape as viewed from the top and are not connected to one another. If bending forces arise on the radial steel struts, they lead to high bending moments.

A square floating foundation is known from the document WO 2007/096680 A1; the floats arranged at the corners are connected to one another via tie rods and struts to form a spatial support structure. A central, large float supports a tower that is braced via stay cables to the external floats. This solution requires considerable construction costs.

The document U.S. Pat. No. 7,156,586 B2 describes a floating support structure that has bracing leg sections going out radially from a tower. They are provided with floats on their ends. Stay cables are connected under tension between the floats and the tower to stabilize the tower position. Stress concentrations result on the base of the central tower that could lead to difficulties, but would at least increase the construction costs.

The document EP 1 288 122 A2 discloses a floating support structure in the form of a massive floating platform with several chambers that are filled with air like a diving bell and that can consequently be used to generate buoyancy. The construction of a floating foundation of that type is associated with high material costs.

The documents EP 1 876 093 A3 and DE 10 2008 003 647 A1 involve floating support structures for which floats are provided at ends radially extending from a central structure.

An offshore wind turbine is known from the document WO 2011/057 940 A2. It has a float that is connected via connection elements to the tower of the wind turbine. Furthermore, the offshore wind turbine has a counterweight at the end of the tower. The connection elements are arranged uniformly in several groups around the tower here. A lower group essentially carries the tower and two upper groups support and position the tower. The upper groups engage at points of the tower that are on top of one another. The tower can rotate with respect to the float because of the uniform distribution of the connection elements. The position of the tower therefore changes with respect to the float. At the same time, various forces arise in the connection elements because of the different angles of the connection elements with respect to the tower. A uniform distribution of forces no longer exists.

The document US 2005/0 206 168 A1 involves a foundation structure for offshore wind turbines; the tower of the wind turbine is connected via a grid structure to floats. The main elements here are struts that are distributed uniformly around the tower. A rotary movement of the tower with respect to the foundation structure is not ruled out.

The document WO 2004/055 272 A2 shows an offshore wind turbine with the possibility of creating a useful marine culture. The tower of the wind turbine is held in a float here via elements that are fastened to the tower and distributed around it in a uniform manner. In so doing, a rotary movement of the tower with respect to the float is, once again, not ruled out.

The document WO 2013/040871 A1 involves a semi-submersible floating platform with at least three floating, hollow concrete cylinders that are connected with one another via a cross-frame structure. The hollow concrete cylinders constitute the buoyant bodies for the floating platform that cut through the surface of the water.

A floating arrangement for generating energy with at least three floating units, each with equipment for generating energy, is known from the document US 2010/0219645 A1. Each of the units has a buoyant body and equipment for generating energy. The units and therefore the equipment for generating energy are arranged at the corner points of a triangle or square.

SUMMARY

The invention relates to support structures floating in the open sea and connected to anchors by bracing elements, for wind turbines, service stations or converter stations.

They especially distinguish themselves by their reliable and stable anchoring.

To this end, the support structure has a first component arranged under water and a second component cutting through the surface of the water.

Furthermore, the first component has first buoyant bodies arranged at the corner points of a polygon and serving as carriers of the second component and second buoyant bodies connecting them with one another and having a tube shape. A nodal structure connecting at least two second buoyant bodies with one another and at least one U-shaped junction plate are arranged in the first buoyant body. The nodal structure is simultaneously the carrier for a tube-shaped support element and is therefore a node of the underwater support structure that absorbs and channels off forces in connection with the junction plate. The second component has the tube-shaped support elements cutting through the surface of the water, which are connected via support gear to a foundation structure for the wind turbine, the service station or the converter station.

DETAILED DESCRIPTION

The invention is based on the problem of creating a support structure that can float in the open sea and that provides a reliable and stable anchoring of a structure in the form of a wind turbine, service station or converter station.

This problem is solved with the features specified in the instant application.

The support structures for wind turbines, service stations or converter stations floating in the open sea and connected via bracing elements to anchors especially distinguish themselves by their reliable and stable anchoring.

To this end, the support structure has a first component arranged under water and a second component cutting through the surface of the water.

Furthermore, the first component has first buoyant bodies arranged at the corner points of a polygon, extending perpendicular to a plane and serving as carriers of the second component and second buoyant bodies connected to them, arranged in a plane and designed with a tube shape. A nodal structure connecting at least two second buoyant bodies with one another with a star-shaped base area and with at least one junction plate in contact with the nodal structure, designed in the shape of a U and perpendicularly dividing the first buoyant body in certain sections, is arranged in the first buoyant body. The nodal structure is simultaneously the carrier for a tube-shaped support element cutting through the surface of the water and is therefore a node of the underwater support structure that absorbs and channels off forces in connection with the junction plate. The second component has the tube-shaped support elements cutting through the surface of the water on the first buoyant bodies, which are connected via support gear to a foundation structure for the wind turbine, the service station or the converter station.

The support structure therefore represents a spatial support structure in the form of a three-dimensional framework.

The first and second buoyant bodies are connected with one another via the nodal structures of the first buoyant bodies. That especially applies to hollow spaces that, as a whole, represent a hollow space or, subdivided, several hollow spaces of the support structure. The first component therefore forms, on the whole, a buoyant body. The hollow spaces of the support elements, which are partially under water and which are connected to the first buoyant bodies, can, moreover, likewise represent buoyant bodies in an advantageous fashion. That likewise applies to the nodal structures as components of the first buoyant bodies; the hollow areas form, along with those of the first buoyant bodies, a hollow space. They are therefore not only force-absorbing and force-channeling nodal structures, but also buoyant bodies. The second buoyant bodies simultaneously constitute spacing elements for the first buoyant bodies here.

A compact and very economical floating support structure for wind turbines, service stations or converter stations that can both be realized and also used in the open sea therefore exists.

The anchors ensure, in interaction with the bracing elements, a reliable and solid positioning of the support structure at the site.

Advantageous design forms of the invention are specified in further design forms.

According to a further design form, the nodal structure is made up of two plates that are arranged to be at a distance to one another; the second buoyant bodies engage along two lines and the hollow spaces of the second buoyant bodies are therefore connected with one another via the nodal structure. Furthermore, the plates are connected with one another via vertically arranged disks. The nodal structure therefore forms a structure that is compact in and of itself as a component of the first buoyant body. The forces of the buoyant bodies that arise are therefore absorbed and passed along.

They can go to the anchors, on the one hand; the forces of the wind turbine, the service station or the converter station are also passed along through the support elements to the nodal structure and absorbed by it.

On the other hand, they can go through the support elements; they are connected to the anchors via the bracing elements.

The nodal structures and the support elements can also be connected with one another, of course, and further connected to the anchors via bracing elements.

Further, according to an additional design form, the plates are connected with one another via disks projecting vertically outward at the edge of the first buoyant body and/or the plates are connected with one another via disks projecting outward over the edge of the first buoyant body.

According to another design form, the nodal structure is simultaneously the carrier for the support element or a pipe section for the support element that accommodates an end area of the support element.

Either the end area of the support element or the pipe section and the center part of the nodal structure are located between the legs of the U-shaped junction plate according to a further design form. A compact implementation therefore exists.

The first buoyant bodies are arranged in the corner points of a square as the polygon according to an additional design form. Moreover, the base area of the nodal structure is a cross; the legs of the cross are each at a right angle or an angle different than 90° with respect to one another.

According to another design form, several ribs and/or at least one circumferential stabilization ring is arranged in the buoyant bodies. They increase the stability of the buoyant bodies.

According to a further design form, anchors are arranged in an area corresponding to the buoyant bodies. Furthermore, the anchors, on the one hand, and, on the other hand, the nodal structures of the first buoyant bodies, the support elements or both the nodal structures of the first buoyant bodies and the support elements are connected to one another via at least one bracing element that is oriented vertically and/or runs obliquely. Moreover, an anchor or the anchors can be connected to second buoyant bodies via at least one bracing element that is oriented vertically and/or runs obliquely. In particular, bracing elements running obliquely prevent twisting of the support structure and therefore, in particular, of the wind turbine.

According to yet another design form, the support body has at least one ice-breaking and repelling edge or at least one cone in certain sections. The edge can be formed by a plate-shaped body or by plate-shaped bodies on the support body that are arranged at an angle to one another. Furthermore, plate-shaped bodies arranged in the shape of a star, at least in certain sections, can also be arranged on the support body for that. The support body can also have a body with a conical shape that surrounds the support body, though. The support body itself can have a conical design, at least in certain sections.

The support element beneficially has a hollow design for a buoyancy function according to another design form.

The buoyant bodies have at least one hollow space according to an additional design form. The hollow space is a hollow space in the buoyant body that can both be flooded with sea water and also filled with a gaseous medium for positioning as an underwater support structure. To lower the underwater support structure, the hollow spaces of the buoyant bodies are simply flooded so that the underwater support structure sinks towards the bottom of the sea. After connection of the underwater support structure to the anchors on or in the seabed, a gaseous medium is forced into the hollow spaces; the sea water contained in it simultaneously goes out through a valve. The underwater support structure is made buoyant because of that. The underwater support structure is held under water via the anchors and the bracing elements.

The foundation structure is beneficially a pipe section accommodating an end area of the tower of the wind turbine or a platform for the service station or the converter station according to a final design form.

An example of the invention is shown in the drawings in the form of its basic structure in each case, and it will be described in more detail below.

DETAILED DESCRIPTION OF THE PREFERRED EMBODIMENTS

Figure 1:
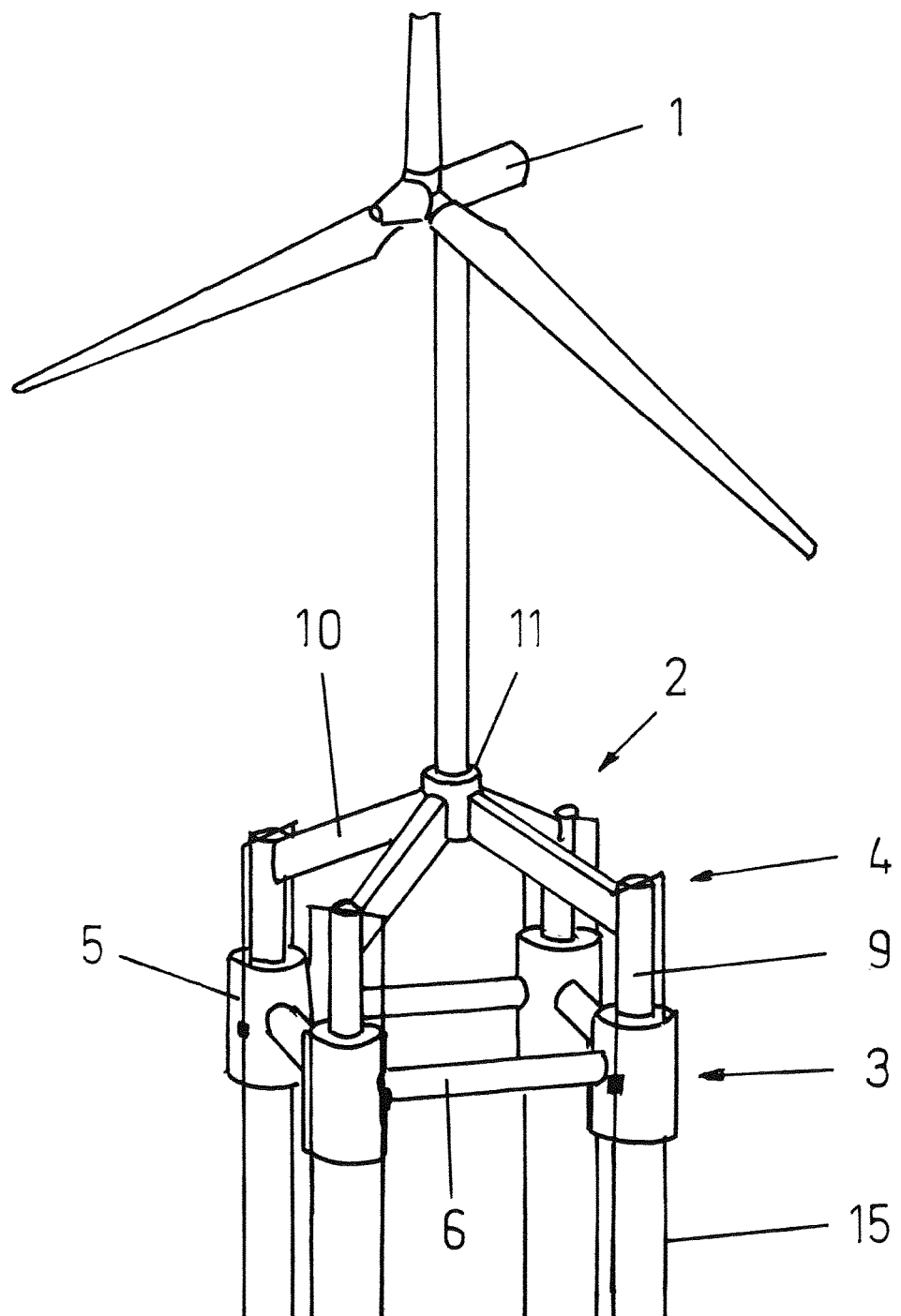
FIG. 1 shows a support structure with a wind turbine floating in the open sea and connected via bracing elements with anchors and FIG. 2 shows a first buoyant body in connection with second buoyant bodies and a support element.

A support structure 2 floating in the open sea and connected to anchors via bracing elements 15 for wind turbines 1, service stations or converter stations is essentially comprised of a first component 3 arranged under water and the second component 4 cutting through the surface of the water.

FIG. 1 shows a support structure floating in the open sea and connected to anchors via bracing elements with a wind turbine in a basic diagram.

The first component 3 arranged under water has first buoyant bodies 5 arranged at the corner points of a square as the polygon and extending perpendicularly to a plane. They also act as carriers of the second component 4 of the support structure 2 cutting through the surface of the water. The first buoyant bodies 5, moreover, are connected to one another via tube-shaped buoyant bodies 6; the latter are arranged in one plane. The first buoyant body 5 essentially has the shape of a closed, hollow cylinder section with a pipe section as the wall, a base plate and a cover plate. The wall has throughholes for the second buoyant body 6, and the cover plate has an opening for a support element 9.

Figure 2:
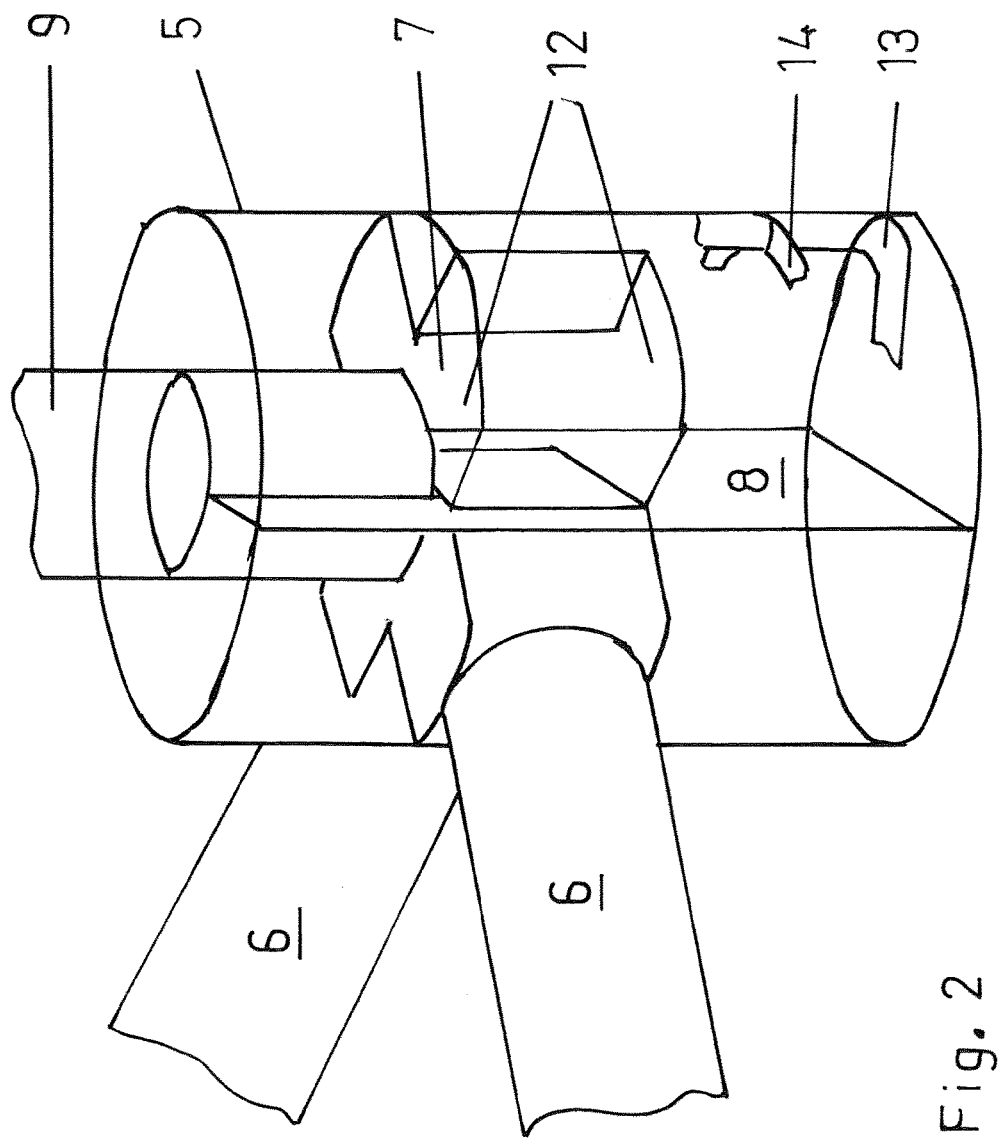

FIG. 2 shows a first buoyant body 5 in connection with second buoyant bodies 6 and a support element 9 in a basic diagram.

A nodal structure 7 with a star-shaped base area connecting at least two second buoyant bodies 6 with one another is arranged in the first buoyant body 5. Furthermore, a junction plate 8 in contact with the nodal structure 7, designed in the shape of a U and perpendicularly dividing the first buoyant body 5 in certain sections, is located in the first buoyant body 5. The nodal structure 7 is simultaneously the carrier for a tube-shaped support element 9 that cuts through the surface of the water. It is therefore a node of the underwater support structure 3 that absorbs and channels off forces in connection with the junction plate 8. To this end, the nodal structure 7 itself is comprised of two plates 12 arranged at a distance to one another; the second buoyant bodies 6 engage along two lines and the hollow spaces of the second buoyant bodies 6 are therefore connected with one another via the nodal structure 7. The end area of the support element 9 and the center part of the nodal structure 7 are located between the legs of the U-shaped junction plate 8. The plates 12 of the nodal structure 7 are connected to one another via vertical disks. The base area of the nodal structure 7 is a cross with a star shape; the legs of the cross are each at a right angle to one another.

The plates 12 in one embodiment are connected to one another via disks projecting vertically outward at the edge of the first buoyant body 5 and/or via disks projecting outward over the edge of the first buoyant body 5.

Several ribs 13 and/or at least one circumferential stabilization ring 14 is arranged in the buoyant bodies 5, 6.

The buoyant bodies 5, 6 have at least one hollow space. The hollow space is a hollow space of the buoyant bodies 5, 6 that can both be flooded with sea water and also filled with a gaseous medium for positioning as an underwater support structure 3.

The second component 4 has the tube-shaped support elements 9 cutting through the surface of the water and the support gear 10 with a foundation structure 11 for the wind turbine 1. The foundation structure 11 is a pipe section 11 accommodating the end area of the tower of the wind turbine 1 for this.

Anchors are arranged in correspondence with the first buoyant bodies 5. An anchor can be connected to the nodal structure 7 of a first buoyant body 5 and/or a support element 9. They can, of course, also be connected to an anchor via a bracing element. To this end, the bracing element 15 is oriented vertically and/or runs obliquely. Moreover, an anchor or the anchors can be connected to second buoyant bodies 6 via at least one bracing element 15 that is oriented vertically and/or runs obliquely.

The invention claimed is:

1. Support structure (2) floating in the open sea and connected to anchors by bracing elements, for wind turbines (1), service stations or converter stations with
    a first component (3) arranged under water with first buoyant bodies (5) arranged at corner points of a polygon, extending perpendicular to a plane and serving as carriers of a second component (4) cutting through the surface of the water and second buoyant bodies (6) connecting the first buoyant bodies (5) with one another, arranged in a plane and having a tube-shaped design, wherein a nodal structure (7) with a multi-prong-shaped base area that connects at least two second buoyant bodies (6) with one another and at least one junction plate (8) in contact with the nodal structure (7), designed in the shape of a U and perpendicularly dividing the first buoyant body (5) in certain sections are arranged in the first buoyant body (5), and the nodal structure (7) is simultaneously the carrier for a tube-shaped support element (9) cutting through the surface of the water and is therefore, in connection with the junction plate (8), a node of the underwater support structure (3) that absorbs and channels along forces, and
    the second component (4) with tube-shaped support elements (9) cutting through the surface of the water on the first buoyant bodies (5), which are connected via support gear (10) to a foundation structure (11) for the wind turbine (1), the service station or the converter station.

2. Support structure according to claim 1, characterized in that the nodal structure (7) is simultaneously the carrier for the support element (9) or a pipe section (9) accommodating the end area of the support element (9).

3. Support structure according to claim 1, characterized in that either the end area of the support element (9) or the pipe section (9) and the center part of the nodal structure (7) are located between the legs of the U-shaped junction plate (8).

4. Support structure according to claim 1, characterized in that the first buoyant bodies (5) are arranged in the corner points of a square as the polygon and that the base area of the nodal structure (7) is a cross, wherein legs of the cross are each at a right angle or an angle different than 90° with respect to one another.

5. Support structure according to claim 1, characterized in that several ribs (13) and/or at least one circumferential stabilization ring (14) is arranged in the buoyant bodies (5, 6).

6. Support structure according to claim 1, characterized in that anchors are arranged in an area corresponding to the buoyant bodies (5, 6) and that the anchors and the nodal structures (7) of the first buoyant bodies (5), the support elements (9) or both the nodal structures (7) of the first buoyant bodies and the support elements (9) are connected with one another via at least one bracing element (15) that is oriented vertically and/or runs obliquely and/or that anchors or the anchor is connected via at least one bracing element (15) that is oriented vertically and/or runs obliquely to second buoyant bodies (6).

7. Support structure according to claim 1, characterized in that the support element (9) has a hollow design for a buoyancy function.

8. Support structure according to claim 1, characterized in that the buoyant bodies (5, 6) have at least one hollow space and that the hollow space is a hollow space of the buoyant bodies (5, 6) that can both be flooded with sea water and filled with a gaseous medium for positioning as an underwater support structure (3).

9. Support structure according to claim 1, characterized in that the foundation structure (11) is a pipe section (11) accommodating an end area of a tower of the wind turbine (1) or a platform for the service station or the converter station.

* * * * *